US012756337B2

(12) United States Patent
Myoen et al.

(10) Patent No.: US 12,756,337 B2
(45) Date of Patent: Oct. 6, 2026

(54) MOTOR CONTROL DEVICE AND MAGNETIC POLE POSITION CALCULATION METHOD

(71) Applicant: Hitachi Astemo, Ltd., Hitachinaka (JP)

(72) Inventors: Kohei Myoen, Hitachinaka (JP); Kentaro Mikawa, Hitachinaka (JP); Yuki Yamabe, Hitachinaka (JP); Takuro Toyoda, Hitachinaka (JP); Junki Isobe, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 217 days.

(21) Appl. No.: 18/840,139

(22) PCT Filed: Mar. 18, 2022

(86) PCT No.: PCT/JP2022/012723
§ 371 (c)(1),
(2) Date: Aug. 21, 2024

(87) PCT Pub. No.: WO2023/175935
PCT Pub. Date: Sep. 21, 2023

(65) Prior Publication Data

US 2025/0192700 A1 Jun. 12, 2025

(51) Int. Cl.
*H02P 6/16* (2016.01)
*H02P 6/17* (2016.01)
*H02P 6/18* (2016.01)

(52) U.S. Cl.
CPC ................ *H02P 6/186* (2013.01); *H02P 6/17* (2016.02); *H02P 2207/05* (2013.01)

(58) Field of Classification Search
CPC .... H02P 6/186; H02P 6/16; H02P 6/17; H02P 2207/05

(Continued)

(56) References Cited

U.S. PATENT DOCUMENTS 5,124,625 A * 6/1992 Wakabayashi ............ H02P 8/32 318/400.2
2005/0001584 A1* 1/2005 Matsuura ................ H02P 6/085 318/811

(Continued)

FOREIGN PATENT DOCUMENTS

JP 2006-194861 A 7/2006
JP 2012-068114 A 4/2012

(Continued)

OTHER PUBLICATIONS

International Search Report, PCT/JP2022/012723, May 31, 2022, 2 pgs.

*Primary Examiner* — Gabriel Agared
(74) *Attorney, Agent, or Firm* — Volpe Koenig

(57) ABSTRACT

A motor control device that is connected to an angle sensor that outputs a sine wave signal and a cosine wave signal that change according to a magnetic pole position of a motor, and that calculates the magnetic pole position on the basis of the sine wave signal and the cosine wave signal output from the angle sensor to control the motor using the magnetic pole position, the motor control device including: a phase difference calculation unit that calculates a difference between phases of the sine wave signal and the cosine wave signal; and a phase change unit that changes and corrects the phases of the sine wave signal and the cosine wave signal, respectively, by the same amount so that the phase difference being corrected becomes 90 degrees in terms of an electrical angle on the basis of the phase difference calculated by the phase difference calculation unit.

6 Claims, 4 Drawing Sheets

(58) Field of Classification Search
USPC .................................................... 318/400.32
See application file for complete search history.

(56) References Cited

U.S. PATENT DOCUMENTS

| | | | | |
|---|---|---|---|---|
| 2006/0125439 | A1* | 6/2006 | Ajima | B60K 6/48 318/716 |
| 2006/0136169 | A1 | 6/2006 | Shonai et al. | |
| 2007/0132423 | A1* | 6/2007 | Ajima | H02P 6/10 318/719 |
| 2012/0078560 | A1 | 3/2012 | Satou et al. | |
| 2014/0347040 | A1* | 11/2014 | Kawase | G01D 5/2448 324/207.12 |
| 2018/0069496 | A1* | 3/2018 | Mizuo | H02P 8/18 |
| 2018/0351484 | A1* | 12/2018 | Mizuo | H02P 6/24 |
| 2020/0041308 | A1 | 2/2020 | Kuwahara et al. | |
| 2022/0089216 | A1* | 3/2022 | Kobayashi | B62D 5/0463 |
| 2022/0120590 | A1 | 4/2022 | Furukawa et al. | |

FOREIGN PATENT DOCUMENTS

| | | | |
|---|---|---|---|
| JP | 2018-185287 | A | 11/2018 |
| JP | 2020-141529 | A | 9/2020 |
| WO | 2020/213181 | A1 | 10/2020 |

* cited by examiner

MOTOR CONTROL DEVICE AND MAGNETIC POLE POSITION CALCULATION METHOD

TECHNICAL FIELD

The present invention relates to a device that controls a motor and a method for calculating a magnetic pole position of the motor.

BACKGROUND ART

Conventionally, in a motor control device that controls a synchronous motor using a permanent magnet as a magnetic pole, a magnetic pole position of the motor is calculated on the basis of an angle signal output from an angle sensor such as a resolver attached to the motor, and the motor is controlled on the basis of the calculation result. Accurate calculation of the magnetic pole position of the motor leads to improvement of output torque accuracy of the motor, and thus, leads to suppression of vehicle vibration in a motor mounted on an electric vehicle, for example. Therefore, a technique enabling calculation of a magnetic pole position of a motor with high accuracy is required.

In general, a calculation result of a magnetic pole position based on an angle signal includes an offset error that always occurs with respect to a true value, and a periodic error that periodically occurs according to rotation of the motor. Among these errors, while an offset error can be easily corrected by a known method, it may be difficult to correct a periodic error. In particular, while a phase difference between a sine wave signal (sine signal) and a cosine wave signal (cosine signal) output from an angle sensor is ideally 90 degrees, deviation of this phase difference from 90 degrees leads to occurrence of a periodic error that is difficult to correct in the calculation result of the magnetic pole position of the motor. As a result, a periodic error also occurs in a calculated value of the number of motor revolutions, and fluctuation may be induced in an output torque of the motor.

For improving calculation accuracy of a magnetic pole position of a motor, for example, a technique described in PTL 1 is known. PTL 1 describes a device that corrects a sine signal and a cosine signal output from a magnetic sensor according to a rotation angle of a rotation body on the basis of magnetic sensor correction information set in advance such that a value of the sine signal or the cosine signal approaches a value of a reference sine signal or cosine signal of the magnetic sensor.

CITATION LIST

Patent Literature

PTL 1: JP 2018-185287 A

SUMMARY OF INVENTION

Technical Problem

In the technique described in Patent Literature 1, when a difference between the value of the sine signal or the cosine signal output from the magnetic sensor and the value of the reference sine signal or cosine signal is large, a correction amount becomes so large that a corrected sine signal or cosine signal may deviate greatly from an original value. In this case, since a magnetic pole position of the motor calculated from the corrected sine signal and cosine signal largely deviates from an original magnetic pole position, the magnetic pole position of the motor cannot be calculated with high accuracy.

Solution to Problem

A motor control device according to the present invention is connected to an angle sensor that outputs a sine wave signal and a cosine wave signal that change according to a magnetic pole position of a motor, and that calculates the magnetic pole position on the basis of the sine wave signal and the cosine wave signal output from the angle sensor to control the motor using the magnetic pole position, the motor control device including: a phase difference calculation unit that calculates a difference between phases of the sine wave signal and the cosine wave signal; and a phase change unit that changes and corrects the phases of the sine wave signal and the cosine wave signal, respectively, by the same amount so that the phase difference being corrected becomes 90 degrees in terms of an electrical angle on the basis of the phase difference calculated by the phase difference calculation unit.

A magnetic pole position calculation method according to the present invention is a method for calculating a magnetic pole position of a motor on the basis of a sine wave signal and a cosine wave signal that change according to the magnetic pole position, the method including the steps of: calculating a difference between phases of the sine wave signal and the cosine wave signal; changing and correcting the phases of the sine wave signal and the cosine wave signal, respectively, by the same amount so that the phase difference being corrected becomes 90 degrees in terms of an electrical angle on the basis of the phase difference calculated; and calculating the magnetic pole position on the basis of the sine wave signal and the cosine wave signal whose phases have been corrected.

Advantageous Effects of Invention

According to the present invention, a magnetic pole position of a motor can be calculated with high accuracy.

DESCRIPTION OF EMBODIMENTS

In the following, an embodiment of the present invention will be described in detail with reference to the drawings. In the present embodiment, an example of application to a motor drive system used while being mounted on an electric vehicle such as an electric car or a hybrid car will be described.

Figure 1:
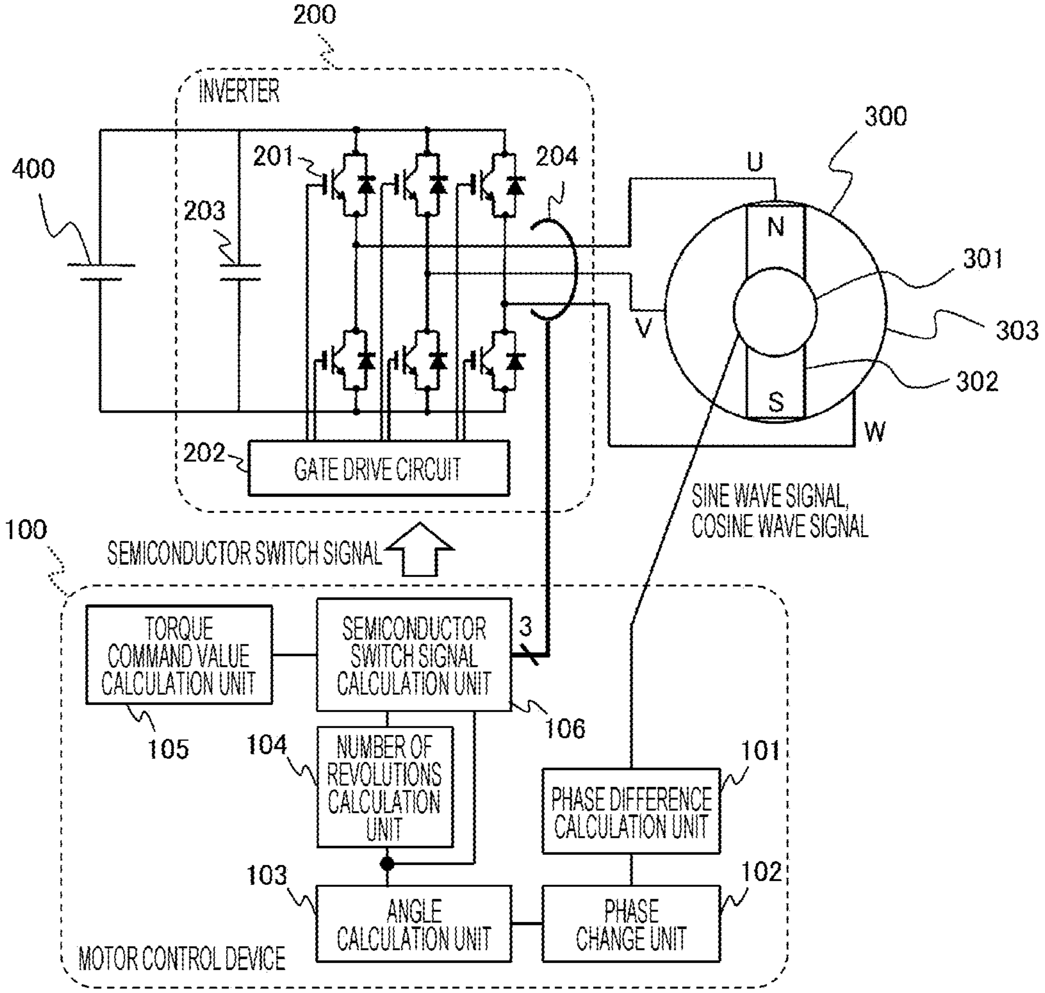
FIG. 1 is a diagram illustrating a configuration of a motor drive system including a motor control device according to an embodiment of the present invention.

FIG. 1 is a diagram illustrating a configuration of a motor drive system including a motor control device according to an embodiment of the present invention. The motor drive system illustrated in FIG. 1 includes a motor control device 100, an inverter 200, a motor 300, and a high voltage battery 400.

The motor control device 100 calculates a torque command value corresponding to a target torque required of the motor 300 by a vehicle, and generates a semiconductor switch signal for controlling operation of a plurality of semiconductor switch elements 201 included in the inverter 200 on the basis of the torque command value. Then, by outputting the generated semiconductor switch signal to the inverter 200, the motor control device controls the operation of each semiconductor switch element 201 of the inverter 200 to control the motor 300. Details of the motor control device 100 will be described later.

The inverter 200 has an inverter circuit including a plurality of semiconductor switch elements 201, a gate drive circuit 202, a smoothing capacitor 203, and a current sensor 204. The gate drive circuit 202 generates a gate drive signal for controlling each semiconductor switch element 201 of the inverter circuit on the basis of the semiconductor switch signal input from the motor control device 100, and outputs the gate drive signal to each semiconductor switch element 201. The inverter circuit is provided with the semiconductor switch elements 201 corresponding to upper arms and lower arms of a U phase, a V phase, and a W phase, respectively, in which each semiconductor switch element 201 is switched at predetermined timing according to the gate drive signal input from the gate drive circuit 202 to convert direct current power supplied from the high voltage battery 400 into three-phase alternating current power and output the converted power to the motor 300.

The smoothing capacitor 203 smooths the direct current power supplied from the high voltage battery 400 to the inverter 200. The current sensor 204 detects an alternating current flowing from the inverter 200 to each phase of the motor 300, and outputs a current detection signal corresponding to a magnitude of the current of each phase to the motor control device 100.

The motor 300 is a synchronous motor rotationally driven by supply of the three-phase alternating current power from the inverter 200, and is electrically connected to the inverter 200. The motor 300 has an angle sensor 301, a rotor 302, and a stator 303. When the three-phase alternating current power input from the inverter 200 is applied to each of three-phase armature coils provided in the stator 303, the three-phase alternating current flows in the motor 300, so that an armature magnetic flux is generated in each phase armature coil. An attraction force and a repulsive force are generated between the armature magnetic flux of each armature coil and a magnet magnetic flux of a permanent magnet arranged in the rotor 302, whereby a torque is generated in the rotor 302, and the rotor 302 is rotationally driven.

The angle sensor 301 outputs a sine wave signal and a cosine wave signal that change according to a magnetic pole position of the motor 300, i.e., a rotation angle of the rotor 302, to the motor control device 100 connected to the angle sensor 301. Note that for the angle sensor 301, for example, a resolver including an iron core and a winding can be used. Alternatively, a magnetoresistive element such as a GMR element, a Hall element, or the like can be used as the angle sensor 301.

The high voltage battery 400 is a direct current power source, and is electrically connected to the inverter 200. The direct current power stored in the high voltage battery 400 is converted into the three-phase alternating current power of variable voltage and variable frequency by the inverter 200 on the basis of the semiconductor switch signal output from the motor control device 100, and is supplied to the motor 300.

The motor control device 100 has functional blocks of a phase difference calculation unit 101, a phase change unit 102, an angle calculation unit 103, a number of revolutions calculation unit 104, a torque command value calculation unit 105, and a semiconductor switch signal calculation unit 106. The motor control device 100 includes, for example, a microcomputer, and can implement these functional blocks by executing a predetermined program in the microcomputer. Alternatively, some or all of these functional blocks may be realized using a hardware circuit such as a logic IC or an FPGA.

The phase difference calculation unit 101 calculates a phase difference between the sine wave signal and the cosine wave signal output from the angle sensor 301. Details of a phase difference calculation method by the phase difference calculation unit 101 will be described later.

The phase change unit 102 corrects the phases of the sine wave signal and the cosine wave signal on the basis of the phase difference between the sine wave signal and the cosine wave signal calculated by the phase difference calculation unit 101. Details of a method for correcting the phases of the sine wave signal and the cosine wave signal by the phase change unit 102 will be described later.

The angle calculation unit 103 calculates a magnetic pole position of the motor 300 on the basis of the sine wave signal and the cosine wave signal whose phases have been corrected by the phase change unit 102. Here, for example, the magnetic pole position of the motor 300 can be calculated from the corrected phases of the sine wave signal and the cosine wave signal by a known calculation formula using a trigonometric function.

The number of revolutions calculation unit 104 calculates the number of revolutions (rotation speed) of the motor 300 by measuring a change amount per unit time of the magnetic pole position calculated by the angle calculation unit 103.

The torque command value calculation unit 105 calculates a torque command value for the motor 300 on the basis of the target torque of the motor 300 input from a host control device (not illustrated).

The semiconductor switch signal calculation unit 106 calculates a semiconductor switch signal for each semiconductor switch element 201 on the basis of the torque command value calculated by the torque command value calculation unit 105, the magnetic pole position and the revolution of the motor 300 calculated by the angle calculation unit 103 and the number of revolutions calculation unit 104, respectively, and the current detection signal input from the current sensor 204. The semiconductor switch signal calculation unit 106 can generate, as a semiconductor switch signal, a three-phase pulse train signal having a pulse width corresponding to the three-phase alternating current power to be output to the motor 300, for example, by performing known PWM calculation.

The semiconductor switch signal calculated by the semiconductor switch signal calculation unit 106 is output from the motor control device 100 to the inverter 200. In the inverter 200, the gate drive signal is generated by the gate drive circuit 202 on the basis of this semiconductor switch signal, so that the operation of each semiconductor switch element 201 is controlled to perform conversion from the direct current power to the three-phase alternating current power. Thus, the drive of the motor 300 is controlled in the motor drive system.

Next, details of the phase difference calculation unit 101 and the phase change unit 102 in the motor control device 100 will be described below with reference to FIGS. 2 to 4.

Figure 2:
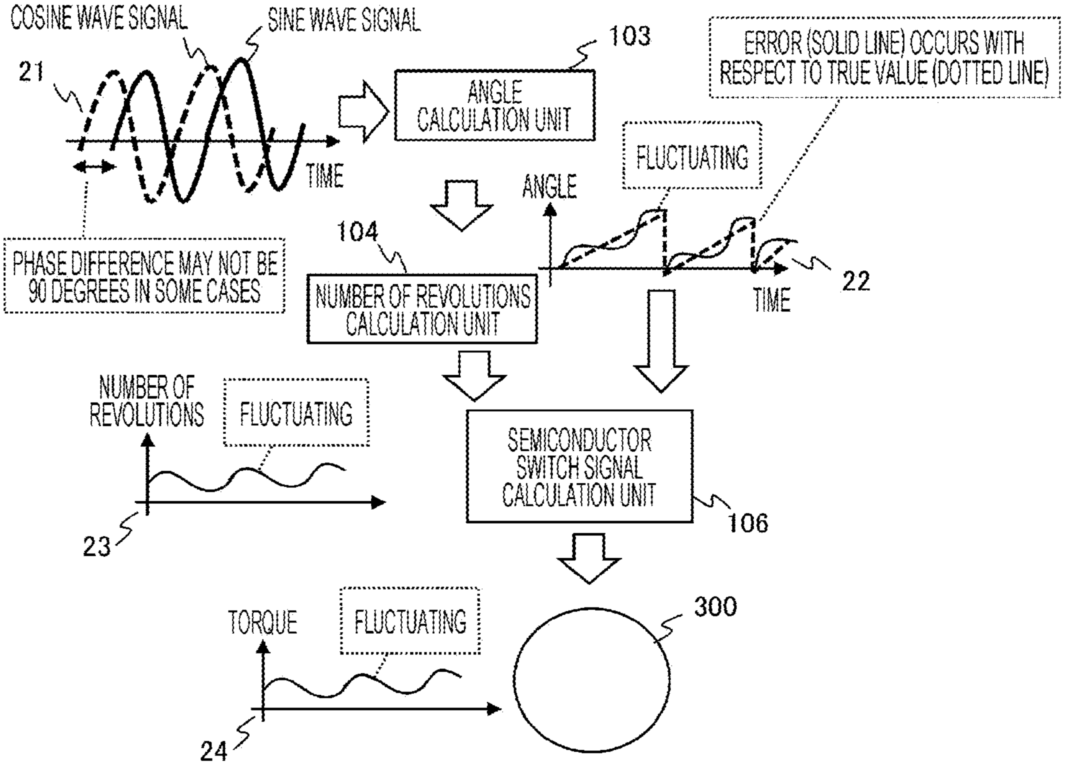
FIG. 2 is an explanatory diagram of a relationship between an error of an angle sensor and torque fluctuation.

FIG. 2 is an explanatory diagram of a relationship between an error of the angle sensor and torque fluctuation.

A graph 21 illustrated in the upper left of FIG. 2 is an example of a sine wave signal and a cosine wave signal before correction which are output from the angle sensor 301. Although a phase difference between these signals is ideally 90 degrees, the phase difference may not actually be 90 degrees in some cases due to errors, characteristic variations, and the like of components included in the angle sensor 301 and the motor control device 100. Such a deviation of a phase difference causes a fluctuating error as shown in a graph 22 to occur in a calculation result of the magnetic pole position of the motor 300 by the angle calculation unit 103. In addition, also in a calculation result of the number of revolutions of the motor 300 by the number of revolutions calculation unit 104, a fluctuating error occurs as shown in a graph 23.

When the drive control of the motor 300 is performed according to the semiconductor switch signal generated by the semiconductor switch signal calculation unit 106 on the basis of the above calculation results, a fluctuating torque that is not included in the torque command value may be generated in the motor 300 as illustrated in a graph 24 of FIG. 2. Such torque fluctuation may lead to deterioration of ride comfort and operability in a vehicle on which the motor drive system is mounted.

On the other hand, in the motor drive system of the present embodiment, the phase difference calculation unit 101 and the phase change unit 102 are provided in the motor control device 100, and the phases of the sine wave signal and the cosine wave signal are corrected using these units so that the phase difference between the sine wave signal and the cosine wave signal output from the angle sensor 301 becomes 90 degrees. The angle calculation unit 103 calculates a magnetic pole position of the motor 300 using the sine wave signal and the cosine wave signal whose phases have been corrected. This prevents generation of a fluctuating error as shown in the graph 22, thereby suppressing generation of torque fluctuation in the motor 300.

Figure 3:
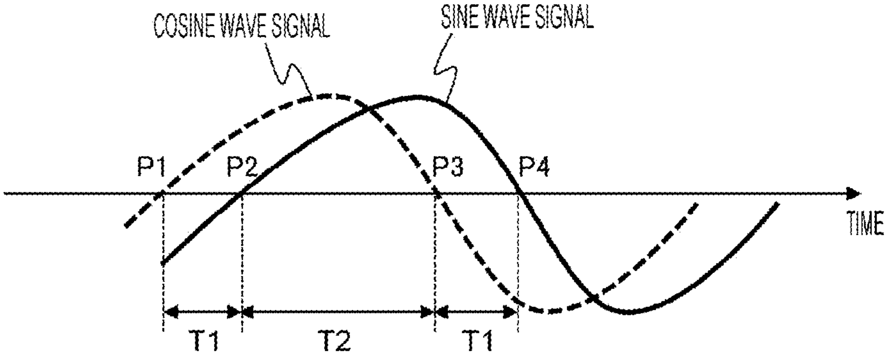
FIG. 3 is an explanatory diagram of a phase difference calculation method by a phase difference calculation unit.

FIG. 3 is an explanatory diagram of the phase difference calculation method by the phase difference calculation unit 101.

In the motor control device 100, the phase difference calculation unit 101 detects a zero cross point for each of the sine wave signal and the cosine wave signal output from the angle sensor 301. The zero cross point is a point at which an amplitude of the sine wave signal or the cosine wave signal indicates zero, i.e., a point at which a signal voltage crosses zero and changes from positive to negative or from negative to positive. The phase difference calculation unit 101 can calculate a phase difference between the sine wave signal and the cosine wave signal on the basis of an interval between the respective detected zero cross points.

For example, as illustrated in FIG. 3, consideration will be given to a case where zero cross points P1 and P3 are detected for the cosine wave signal and zero cross points P2 and P4 are detected for the sine wave signal. In this case, assuming that an interval from the first zero cross point P1 to the next zero cross point P2 is T1, and an interval from the second zero cross point P1 to the next zero cross point P3 is T2, when the number of revolutions of the motor 300 is constant, an interval from the third zero cross point P3 to the next zero cross point P4 is the same as the interval T1 between the zero cross points P1 and P2. Therefore, an interval between the zero cross points P1 and P3 of the cosine wave signal and an interval between the zero cross points P2 and P4 of the sine wave signal are both obtained as T1+T2.

Therefore, the phase difference calculation unit 101 can calculate a phase difference θdiff between the sine wave signal and the cosine wave signal by the following Formula (1).

$$\theta diff = 180 \times T1 \div (T1 + T2) \tag{1}$$

The phase difference calculation unit 101 can obtain these signal periods from the intervals between the zero cross points detected for the sine wave signal and the cosine wave signal. Then, when a difference between the signal periods is within a predetermined threshold, the number of revolutions of the motor 300 can be regarded as constant. Therefore, the phase difference calculation unit 101 observes periods of the sine wave signal and the cosine wave signal input from the angle sensor 301, and when the difference is within the predetermined threshold, the phase difference calculation unit can calculate the phase difference using Formula (1) on the basis of the interval between the respective zero cross points detected from the sine wave signal and the cosine wave signal.

Note that the phase difference calculation unit 101 may calculate the phase difference between the sine wave signal and the cosine wave signal by a method other than the above. Any calculation method can be used as long as a phase difference between the sine wave signal and the cosine wave signal can be appropriately obtained.

Figure 4:
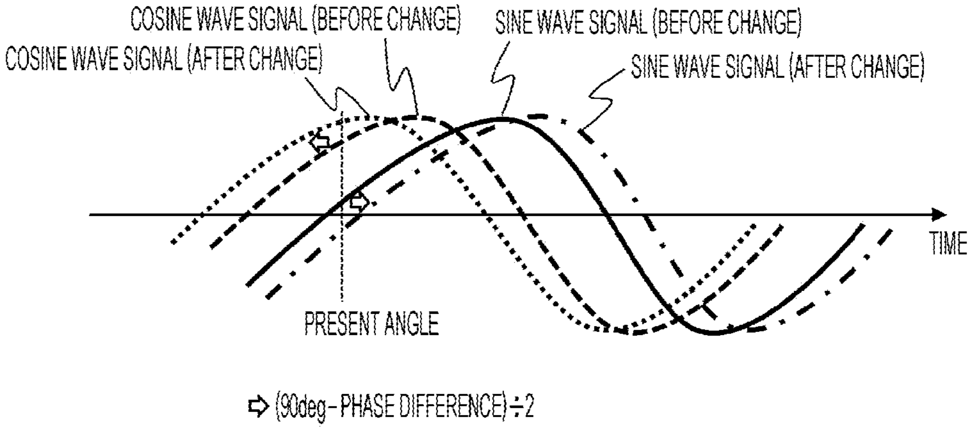
FIG. 4 is an explanatory diagram of a method for correcting phases of a sine wave signal and a cosine wave signal by a phase change unit.

FIG. 4 is an explanatory diagram of the method for correcting phases of a sine wave signal and a cosine wave signal by the phase change unit 102.

In the motor control device 100, on the basis of the phase difference between the sine wave signal and the cosine wave signal calculated by the phase difference calculation unit 101, the phase change unit 102 changes and corrects the phases of the sine wave signal and the cosine wave signal, respectively, by the same amount so that the corrected phase difference becomes 90 degrees in terms of an electrical angle. Specifically, the phases of the sine wave signal and the cosine wave signal are respectively changed in the following manner in a case where the phase difference calculated by the phase difference calculation unit 101 is less than 90 degrees and a case where the phase difference is larger than 90 degrees.

It is assumed that the phases of the present (before correction) sine wave signal and cosine wave signal are θ sin 0 [deg] and θ cos 0 [deg], respectively, and that the phase difference calculated by the phase difference calculation unit 101 according to the above-described Formula (1) is θdiff [deg]. At this time, when the phase difference θdiff is less than 90 degrees, the phase change unit 102 can calculate the corrected sine wave signal A and cosine wave signal B by, for example, the following Formulas (2) and (3).

$$A = \mathrm{SIN}(\theta\sin 0 - (90 - \theta diff) \div 2) \quad (2)$$

$$B = \mathrm{COS}(\theta\sin 0 + (90 - \theta diff) \div 2) \quad (3)$$

With a half of a value obtained by subtracting the phase difference θdiff from 90 degrees according to Formulas (2) and (3) as a phase correction value, the phase change unit 102 sets a value obtained by subtracting the phase correction value from the phase θ sin 0 of the present sine wave signal as the corrected sine wave signal A, and sets a value obtained by adding the phase correction value to the phase θ cos 0 of the present cosine wave signal as the corrected cosine wave signal B. As a result, for example, as illustrated in FIG. 4, it is possible to obtain the corrected cosine wave signal B by changing a phase of an original cosine wave signal to advance from the present angle by the phase correction value and the corrected sine wave signal A by changing a phase of an original sine wave signal to delay from the present angle by the phase correction value.

When the phase difference θdiff is larger than 90 degrees, the phase change unit 102 can calculate the corrected sine wave signal A and cosine wave signal B by the following Formulas (4) and (5), for example.

$$A = \mathrm{SIN}(\theta\sin 0 + (\theta diff - 90) \div 2) \quad (4)$$

$$B = \mathrm{COS}(\theta\sin 0 - (\theta diff - 90) \div 2) \quad (5)$$

With a half of a value obtained by subtracting 90 degrees from the phase difference θdiff according to Formulas (4) and (5) as a phase correction value, the phase change unit 102 sets a value obtained by adding the phase correction value to the phase θ sin 0 of the present sine wave signal as the corrected sine wave signal A, and sets a value obtained by subtracting the phase correction value from the phase θ cos 0 of the present cosine wave signal as the corrected cosine wave signal B. As a result, it is possible to obtain the corrected cosine wave signal B by changing the phase of the original cosine wave signal to delay from the present angle by the phase correction value and the corrected sine wave signal A by changing the phase of the original sine wave signal to advance from the present angle by the phase correction value.

Figure 5:
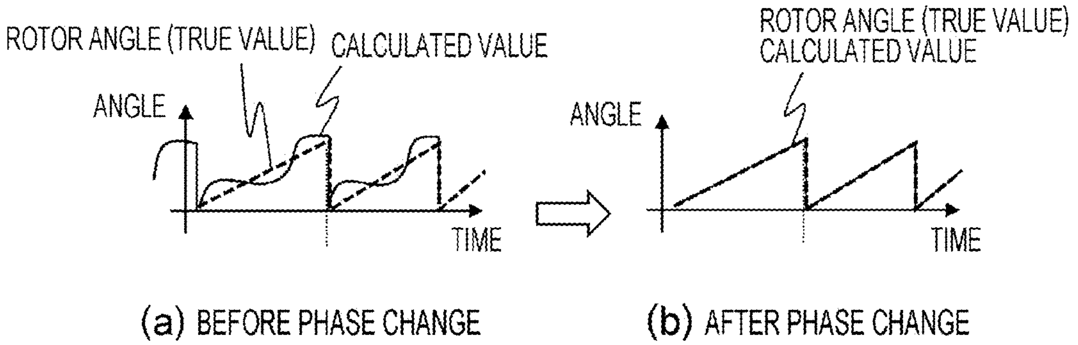
FIG. 5 is a diagram illustrating a comparison example of a calculated value and a true value of a rotor angle obtained from a sine wave signal and a cosine wave signal before and after phase change, respectively.

FIG. 5 is a diagram illustrating a comparison example of a calculated value and a true value of an angle (magnetic pole position) of the rotor 302 obtained from the sine wave signal and the cosine wave signal before and after the phase change, respectively.

In a case where an error is included in the phase difference between the sine wave signal and the cosine wave signal output from the angle sensor 301, before the phase change by the phase change unit 102, for example, as illustrated in FIG. 5(*a*), the calculated value obtained by the angle calculation unit 103 fluctuates up and down with respect to the true value of the angle of the rotor 302. On the other hand, after the phase change performed by the phase change unit 102, for example, as illustrated in FIG. 5(*b*), the calculated value obtained by the angle calculation unit 103 can be matched with the true value of the angle of the rotor 302. As a result, it can be seen that a magnetic pole position of the motor 300 can be calculated with high accuracy.

When the phase difference θdiff is less than 90 degrees, the phase change unit 102 calculates the corrected sine wave signal A and cosine wave signal B using Formulas (2) and (3). On the other hand, when the phase difference θdiff is larger than 90 degrees, the phase change unit calculates the corrected sine wave signal A and cosine wave signal B using Formulas (4) and (5). In other words, in any case, the correction is performed by changing the phases of the sine wave signal and the cosine wave signal by the same amount so that the phase difference between the corrected sine wave signal A and cosine wave signal B becomes 90 degrees in terms of an electrical angle. As a result, there exists an angular offset between the angle sensor 301 and the rotor 302, so that even when an offset error is included in each of the phases of the sine wave signal and the cosine wave signal output from the angle sensor 301 due to this angular offset, an average value of offset errors during one rotation of the rotor 302 can be set to zero in the calculated values of the magnetic pole position obtained by the angle calculation unit 103. Therefore, even when there is an offset error, the magnetic pole position of the motor 300 can be calculated with high accuracy by matching with the true value of the angle of the rotor 302.

Figure 6:
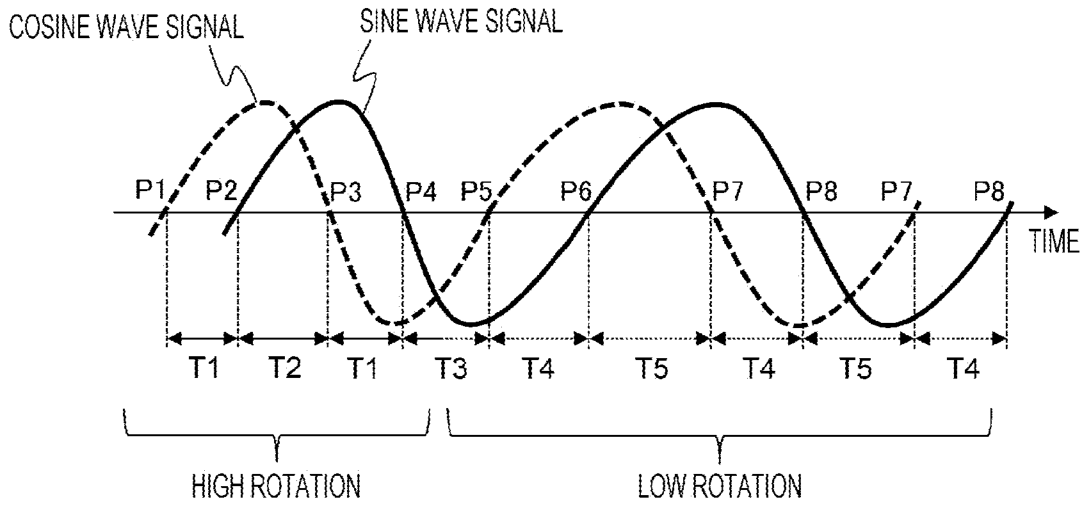
FIG. 6 is an explanatory diagram of a phase difference detection method when the number of motor revolutions changes.

FIG. 6 is an explanatory diagram of the phase difference detection method when the number of motor revolutions changes.

In the motor control device 100, as described above, the phase difference calculation unit 101 detects the zero cross point for each of the sine wave signal and the cosine wave signal output from the angle sensor 301, and calculates periods of the sine wave signal and the cosine wave signal from an interval of each zero cross point. Then, when a difference between these signal periods is within a predetermined threshold, a phase difference between the sine wave signal and the cosine wave signal is calculated by Formula (1). This is because the phase difference cannot be correctly calculated in a state where the number of revolutions of the motor 300 is changed because the periods of the sine wave signal and the cosine wave signal are also changed. In other words, when the number of revolutions of the motor 300 is calculated on the basis of a magnetic pole position calculated using a phase difference calculated in a state where the number of revolutions of the motor 300 is changed, it is not possible to determine whether fluctuation included in the calculation result is caused by fluctuation of the phase difference or by the change in the number of revolutions of the motor 300. Therefore, the phase difference calculation unit 101 preferably calculates a phase difference between the sine wave signal and the cosine wave signal when a change in the number of revolutions of the motor 300 can be regarded as being within a certain range.

For example, as illustrated in FIG. 6, consideration will be given to a case where intervals between the zero cross points of the sine wave signal and the cosine wave signal input from the angle sensor 301 to the phase difference calculation unit 101 are T1, T2, and T1, respectively, at the time of high rotation when the motor 300 has a high number of revolutions. In this case, a difference between the period T2+T1 of the sine wave signal and the period T1+T2 of the cosine wave signal is zero, so that the phase difference θdiff can be calculated by Formula (1).

On the other hand, when the number of revolutions of the motor 300 shifts from high rotation to low rotation, a difference between the period T2+T1 of the sine wave signal and the period T1+T3 of the cosine wave signal is (T2+T1)-(T1+T3). When the period difference is within the predetermined threshold, the phase difference calculation unit 101 calculates a phase difference between the sine wave signal and the cosine wave signal, and when the period difference exceeds the threshold, the phase difference calculation unit does not calculate a phase difference.

At the low rotation when the number of revolutions of the motor 300 is low, a difference between the period T5+T4 of the sine wave signal and the period T4+T5 of the cosine wave signal is zero, so that, by replacing T1 and T2 with T4 and T5 in Formula (1), the phase difference θdiff can be calculated using Formula (1) similarly to the case of high rotation.

The above threshold is determined by how much a phase difference between the sine wave signal and the cosine wave signal needs to be brought close to an ideal value of 90 degrees. Specifically, a threshold of a period difference for performing the phase difference calculation of the sine wave signal and the cosine wave signal by the phase difference calculation unit 101 is determined according to a degree to which a fluctuating error due to phase difference deviations is allowed at a magnetic pole position obtained from the corrected sine wave signal A and cosine wave signal B calculated by the above Formulas (2), (3) or (4), (5) and according to a degree to which torque fluctuation of the motor 300 caused by the fluctuating error needs to be suppressed.

For example, assuming that the period difference between the sine wave signal and the cosine wave signal is X, the phase difference θdiff between the sine wave signal and the cosine wave signal can be calculated by the following Formula (6) obtained by modifying Formula (1). Assuming that X=0 in Formula (6), the Formula becomes the same as Formula (1).

$$\theta diff = 180 \times T1 \div (T1 + T2 + X) \tag{6}$$

According to one embodiment of the present invention described in the foregoing, the following functions and effects are obtained.

(1) The motor control device 100 is connected to the angle sensor 301 that outputs a sine wave signal and a cosine wave signal that change according to a magnetic pole position of the motor 300, and that calculates the magnetic pole position on the basis of the sine wave signal and the cosine wave signal output from the angle sensor 301 to control the motor 300 using the magnetic pole position. The motor control device 100 includes the phase difference calculation unit 101 that calculates a difference between phases of the sine wave signal and the cosine wave signal, and the phase change unit 102 that changes and corrects the phases of the sine wave signal and the cosine wave signal, respectively, by the same amount so that the phase difference being corrected becomes 90 degrees in terms of an electrical angle on the basis of the phase difference calculated by the phase difference calculation unit 101. With this configuration, a magnetic pole position of the motor 300 can be calculated with high accuracy.

(2) In a case where the phase difference θdiff is less than 90 degrees, with a half of a value obtained by subtracting the phase difference θdiff from 90 degrees according to Formulas (2) and (3) as a phase correction value, the phase change unit 102 corrects the phases of the sine wave signal and the cosine wave signal, respectively, by adding the phase correction value to the phase of the cosine wave signal and subtracting the phase correction value from the phase of the sine wave signal. In addition, in a case where the phase difference θdiff is larger than 90 degrees, with a half of a value obtained by subtracting 90 degrees from the phase difference θdiff according to Formulas (4) and (5) as a phase correction value, the phase change unit corrects the phases of the sine wave signal and the cosine wave signal, respectively, by subtracting the phase correction value from the phase of the cosine wave signal and adding the phase correction value to the phase of the sine wave signal. With this configuration, the phases of the sine wave signal and the cosine wave signal can be appropriately corrected in each of the case where the phase difference between the sine wave signal and the cosine wave signal is less than 90 degrees and the case where the phase difference is larger than 90 degrees.

(3) When a period difference between the sine wave signal and the cosine wave signal is within a predetermined threshold, the phase difference calculation unit 101 calculates a phase difference θdiff between the sine wave signal and the cosine wave signal on the basis of an interval between a zero cross point of the sine wave signal and a zero cross point of the cosine wave signal according to Formula (6). With this configuration, an error included in the phase difference between the sine wave signal and the cosine wave signal can be accurately obtained.

(4) The motor control device 100 includes the angle calculation unit 103 that calculates the magnetic pole position on the basis of the sine wave signal and the cosine wave signal whose phases have been corrected by the phase change unit 102. With this configuration, the calculation of the magnetic pole position of the motor 300 can be realized with high accuracy using the sine wave signal and the cosine wave signal whose phases have been corrected so that the corrected phase difference becomes 90 degrees in terms of an electrical angle.

(5) The motor control device 100 includes the number of revolutions calculation unit 104 that calculates the number of revolutions of the motor 300 on the basis of the magnetic pole position calculated by the angle calculation unit 103, and the semiconductor switch signal calculation unit 106 that calculates a semiconductor switch signal for controlling operation of the plurality of semiconductor switch elements 201 on the basis of the magnetic pole position calculated by the angle calculation unit 103, the number of revolutions of the motor 300 calculated by the number of revolutions calculation unit 104, and a torque command value input from the torque command value calculation unit 105. The motor 300 is connected to the inverter 200 including the plurality of semiconductor switch elements 201, and the inverter 200 converts direct current power into alternating current power and outputs the alternating current power to the motor 300 by switching the plurality of semiconductor switch elements 201, respectively, at predetermined timings on the basis of the semiconductor switch signal output from the semiconductor switch signal calculation unit 106. With this configuration, the motor 300 can be appropriately controlled using the magnetic pole position of the motor 300 calculated with high accuracy, and fluctuation in an output torque of the motor 300 can be suppressed.

Note that while in the embodiment described in the foregoing, the description has been made of the example of application to the motor drive system used while being mounted on an electric vehicle such as an electric car or a hybrid car, the present invention is not limited thereto. The present invention can be applied to a motor control device used in any motor drive system as long as a motor control device is connected to a motor having an angle sensor, and calculates a magnetic pole position on the basis of a sine wave signal and a cosine wave signal output from the angle sensor to control the motor.

In addition, the present invention is not limited to the above-described embodiment, and various modifications can be made without departing from the gist of the present invention.

REFERENCE SIGNS LIST

100 motor control device
101 phase difference calculation unit
102 phase change unit
103 angle calculation unit
104 number of revolutions calculation unit
105 torque command value calculation unit
106 semiconductor switch signal calculation unit
200 inverter
201 semiconductor switch element
202 gate drive circuit
203 smoothing capacitor
204 current sensor
300 motor
301 angle sensor
302 rotor
303 stator
400 high voltage battery

The invention claimed is:

1. A motor control device that is connected to an angle sensor that outputs a sine wave signal and a cosine wave signal that change according to a magnetic pole position of a motor, and that calculates the magnetic pole position on a basis of the sine wave signal and the cosine wave signal output from the angle sensor to control the motor using the magnetic pole position, the motor control device comprising:

a phase difference calculation unit that calculates a difference between phases of the sine wave signal and the cosine wave signal; and a phase change unit that changes and corrects the phases of the sine wave signal and the cosine wave signal, respectively, by a same amount so that the phase difference being corrected becomes 90 degrees in terms of an electrical angle on a basis of the phase difference calculated by the phase difference calculation unit.

2. The motor control device according to claim 1, wherein with a half of a value obtained by subtracting the phase difference from 90 degrees as a phase correction value, the phase change unit corrects the phases of the sine wave signal and the cosine wave signal, respectively, by adding the phase correction value to the phase of the cosine wave signal and subtracting the phase correction value from the phase of the sine wave signal when the phase difference is less than 90 degrees, and with a half of a value obtained by subtracting 90 degrees from the phase difference as a phase correction value, the phase change unit corrects the phases of the sine wave signal and the cosine wave signal, respectively, by subtracting the phase correction value from the phase of the cosine wave signal and adding the phase correction value to the phase of the sine wave signal when the phase difference is larger than 90 degrees.

3. The motor control device according to claim 1, wherein the phase difference calculation unit calculates a difference between the phases of the sine wave signal and the cosine wave signal on a basis of an interval between a zero cross point of the sine wave signal and a zero cross point of the cosine wave signal when a period difference between the sine wave signal and the cosine wave signal is within a predetermined threshold.

4. The motor control device according to claim 1, comprising an angle calculation unit that calculates the magnetic pole position on a basis of the sine wave signal and the cosine wave signal whose phases have been corrected by the phase change unit.

5. The motor control device according to claim 4, comprising:

a number of revolutions calculation unit that calculates a number of revolutions of the motor on the basis of the magnetic pole position calculated by the angle calculation unit; and a semiconductor switch signal calculation unit that calculates a semiconductor switch signal for controlling operation of a plurality of semiconductor switch elements on a basis of the magnetic pole position calculated by the angle calculation unit, the number of revolutions of the motor calculated by the number of revolutions calculation unit, and an input torque command value, wherein the motor is connected to an inverter including the plurality of semiconductor switch elements, the inverter converting direct current power into alternating current power by switching the plurality of semiconductor switch elements, respectively, at predetermined timing on a basis of the semiconductor switch signal output from the semiconductor switch signal calculation unit, and outputting the alternating current power to the motor.

6. A method for calculating a magnetic pole position of a motor on a basis of a sine wave signal and a cosine wave signal that change according to the magnetic pole position, the method comprising the steps of:

calculating a difference between phases of the sine wave signal and the cosine wave signal;

changing and correcting the phases of the sine wave signal and the cosine wave signal, respectively, by a same amount so that the phase difference being corrected becomes 90 degrees in terms of an electrical angle on a basis of the phase difference calculated; and calculating the magnetic pole position on a basis of the sine wave signal and the cosine wave signal whose phases have been corrected.

* * * * *